(12) United States Patent
Ochocinski et al.

(10) Patent No.: US 9,944,200 B2
(45) Date of Patent: Apr. 17, 2018

(54) VARIABLE CREEP TORQUE

(71) Applicant: FORD GLOBAL TECHNOLOGIES, LLC, Dearborn, MI (US)

(72) Inventors: Christopher Adam Ochocinski, Canton, MI (US); Joseph F. Stanek, Northville, MI (US); Matthew Fleming, Dearborn, MI (US); Stephen Li-Chun Shen, Canton, MI (US); Robert David Hancasky, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 14/641,497

(22) Filed: Mar. 9, 2015

(65) Prior Publication Data

US 2016/0264020 A1    Sep. 15, 2016

(51) Int. Cl.
*B60L 15/20* (2006.01)

(52) U.S. Cl.
CPC ....... *B60L 15/2063* (2013.01); *Y02T 10/7275* (2013.01); *Y10S 903/906* (2013.01)

(58) Field of Classification Search
CPC ............. B60L 15/2063; Y10S 903/906; Y02T 10/7275
See application file for complete search history.

(56) References Cited

U.S. PATENT DOCUMENTS

| 5,020,645 | A | * | 6/1991 | Sasa | B60W 10/02 192/3.63 |
| 5,813,940 | A | * | 9/1998 | Ramm | F16H 61/20 477/176 |
| 6,278,916 | B1 | | 8/2001 | Crombez | |
| 6,377,007 | B1 | | 4/2002 | Ozaki et al. | |
| 7,295,918 | B2 | | 11/2007 | Nada | |
| 2013/0017928 | A1 | | 1/2013 | Oh et al. | |
| 2014/0129068 | A1 | * | 5/2014 | Higa | B60K 6/445 701/22 |

FOREIGN PATENT DOCUMENTS

JP    11075304    3/1999

OTHER PUBLICATIONS

"Tesla Model S A Quick Guide for Owners", 2012, Tesla Motors Inc., Slide 8.*
Tesla Forum Discussion, Creep or not to Creep-Suggestion, dated Aug. 2, 2013-Oct. 11, 2013, retrieved from http://www.teslamotors.com/en_EU/forum/forums/creep-or-not-creepsuggestion.
Tesla Model S Owner's Manual, 2012-2013, Tesla Motors, Inc.

* cited by examiner

*Primary Examiner* — Mussa A Shaawat
*Assistant Examiner* — Michael V Kerrigan
(74) *Attorney, Agent, or Firm* — Carlson, Gaskey & Olds, P.C.

(57) ABSTRACT

An exemplary creep torque selection method includes selecting an amount of reverse creep torque for a vehicle. The selecting is independent from an amount of forward creep torque for the vehicle.

20 Claims, 3 Drawing Sheets

US 9,944,200 B2

VARIABLE CREEP TORQUE

TECHNICAL FIELD

This disclosure relates to creep torque and, more particularly, to adjusting an amount of creep torque for when a vehicle is in a forward mode and to separately adjusting an amount of creep torque for when the vehicle is in a reverse mode.

BACKGROUND

Generally, electrified vehicles differ from conventional motor vehicles because electrified vehicles are selectively driven using one or more electric machines. Conventional motor vehicles, in contrast to electrified vehicles, are driven exclusively using an internal combustion engine. The electric machines can drive the electrified vehicles instead of, or in addition to, an internal combustion engine. Example electrified vehicles include: hybrid electric vehicles (HEVs), plug-in hybrid electric vehicles (PHEVs), fuel cell vehicles (FCVs), and battery electric vehicles (BEVs).

Conventional vehicles have creep torque produced by a spinning torque converter. Creep torque resulting from the spinning torque converter can cause a conventional vehicle to move under power when the vehicle is not in park, and a user's foot is not actuating the accelerator pedal or the brake pedal.

Electrified vehicles can be programmed to apply a creep torque to the wheels to mimic the behavior of conventional vehicles. Some electrified vehicles permit a user to turn off the application of creep torque to the wheels.

SUMMARY

A creep torque selection method according to an exemplary aspect of the present disclosure includes, among other things, selecting an amount of reverse creep torque for a vehicle. The selecting is independent from an amount of forward creep torque for the vehicle.

In a further non-limiting embodiment of the foregoing method, the method includes the step of selecting the amount of forward creep torque for the vehicle. The amount of reverse creep torque is different than the amount of forward creep torque.

In a further non-limiting embodiment of any of the foregoing methods, the amount of reverse creep torque is a maximum amount of reverse creep torque for the vehicle, and the amount of forward creep torque is a maximum amount of forward creep torque for the vehicle.

In a further non-limiting embodiment of any of the foregoing methods, the amount of forward creep torque is less than the amount of reverse creep torque.

In a further non-limiting embodiment of any of the foregoing methods, the amount of forward creep torque is zero.

In a further non-limiting embodiment of any of the foregoing methods, the amount of reverse creep torque is selected from at least two preset amounts of reverse creep torque.

In a further non-limiting embodiment of any of the foregoing methods, the at least two preset amounts of reverse creep torque comprise zero reverse creep torque and an increased amount of reverse creep torque.

In a further non-limiting embodiment of any of the foregoing methods, the vehicle is an electrified vehicle.

A creep torque operating method according to an exemplary aspect of the present disclosure includes, among other things, when a vehicle is in a forward mode, applying a forward creep torque that does not exceed a set forward creep torque level, and, when the vehicle is in a reverse mode, applying a reverse creep torque that does not exceed a set reverse creep torque level. The set forward creep torque level is different that the set reverse creep torque level.

In a further non-limiting embodiment of any of the foregoing methods, the vehicle is selectively operable in an ECO vehicle operating mode or a NORMAL vehicle operating mode, the creep torque selectable in the ECO mode and separately selectable in the NORMAL mode.

In a further non-limiting embodiment of the foregoing method, the method includes the step of selecting the set forward creep torque level and selecting the set reverse creep torque level.

In a further non-limiting embodiment of any of the foregoing methods, the selecting of the set forward creep torque level is independent from the selecting of the set reverse creep torque level.

In a further non-limiting embodiment of any of the foregoing methods, the selecting is based on a grade.

In a further non-limiting embodiment of any of the foregoing methods, the selecting is by a user of the vehicle.

In a further non-limiting embodiment of any of the foregoing methods, set forward creep torque level is zero.

In a further non-limiting embodiment of any of the foregoing methods, the vehicle is an electrified vehicle.

A vehicle assembly according to an exemplary aspect of the present disclosure includes, among other things, a wheel of a vehicle, and a controller is configured to command a prime mover of the vehicle to apply a forward creep torque to a wheel when the vehicle is in a forward mode, and a reverse creep torque to the wheel when the vehicle is in a reverse mode. The forward creep torque level does not exceed a set forward creep torque level. The reverse creep torque level does not exceed a set reverse creep torque level that is different that the set forward creep torque level.

In a further non-limiting embodiment of the foregoing assembly, the set forward creep torque level is zero.

In a further non-limiting embodiment of any of the foregoing assemblies, the vehicle is an electrified vehicle.

In a further non-limiting embodiment of any of the foregoing assemblies, the assembly includes a user interface to permit selection of the set forward creep torque level, the set reverse creep torque level, or both.

The embodiments, examples and alternatives of the preceding paragraphs, the claims, or the following figures and description, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to selecting an amount of creep torque to be applied when a vehicle is in a forward mode, and to separately selecting an amount of creep torque to be applied when the vehicle is a reverse mode.

Figure 1:
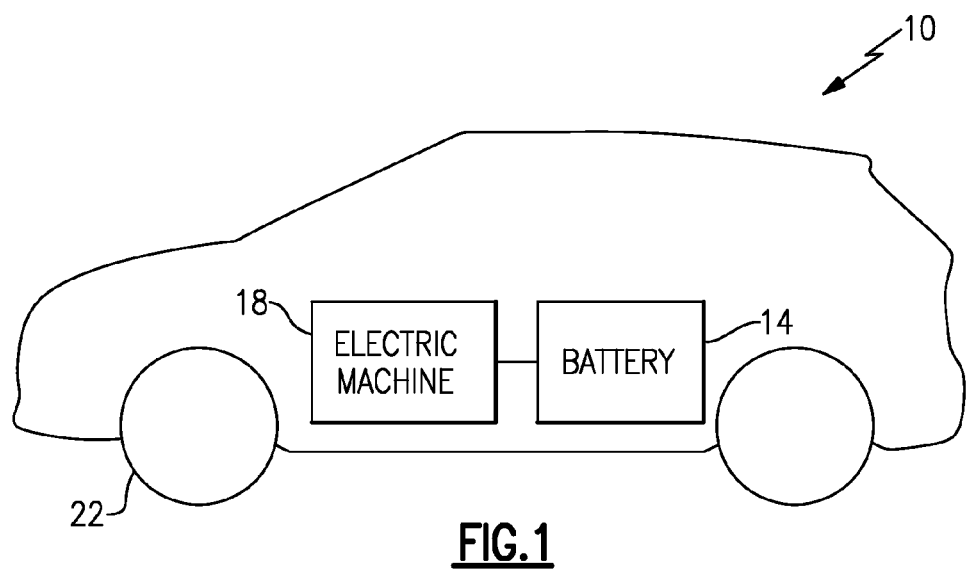
FIG. 1 illustrates a schematic view of an example electrified vehicle.

Referring to FIG. 1, an example electrified vehicle 10 includes a battery 14 that powers an electric machine 18. The vehicle includes wheels 22 driven by the electric machine 18. The electric machine 18 receives electric power from the battery 14 and converts the electric power to torque to drive the wheels 22. The example battery 14 is a relatively high voltage battery.

The example vehicle 10 is an all-electric vehicle. In other examples, the vehicle 10 is a hybrid electric vehicle, which selectively drives wheels using torque provided by an internal combustion engine instead of, or in addition to, the electric machine 18.

In still other examples, the vehicle 10 is a conventional vehicle having wheels driven exclusively with torque from an internal combustion engine rather than a battery. Other examples of the vehicle 10 include fuel cell vehicles.

Figure 2:
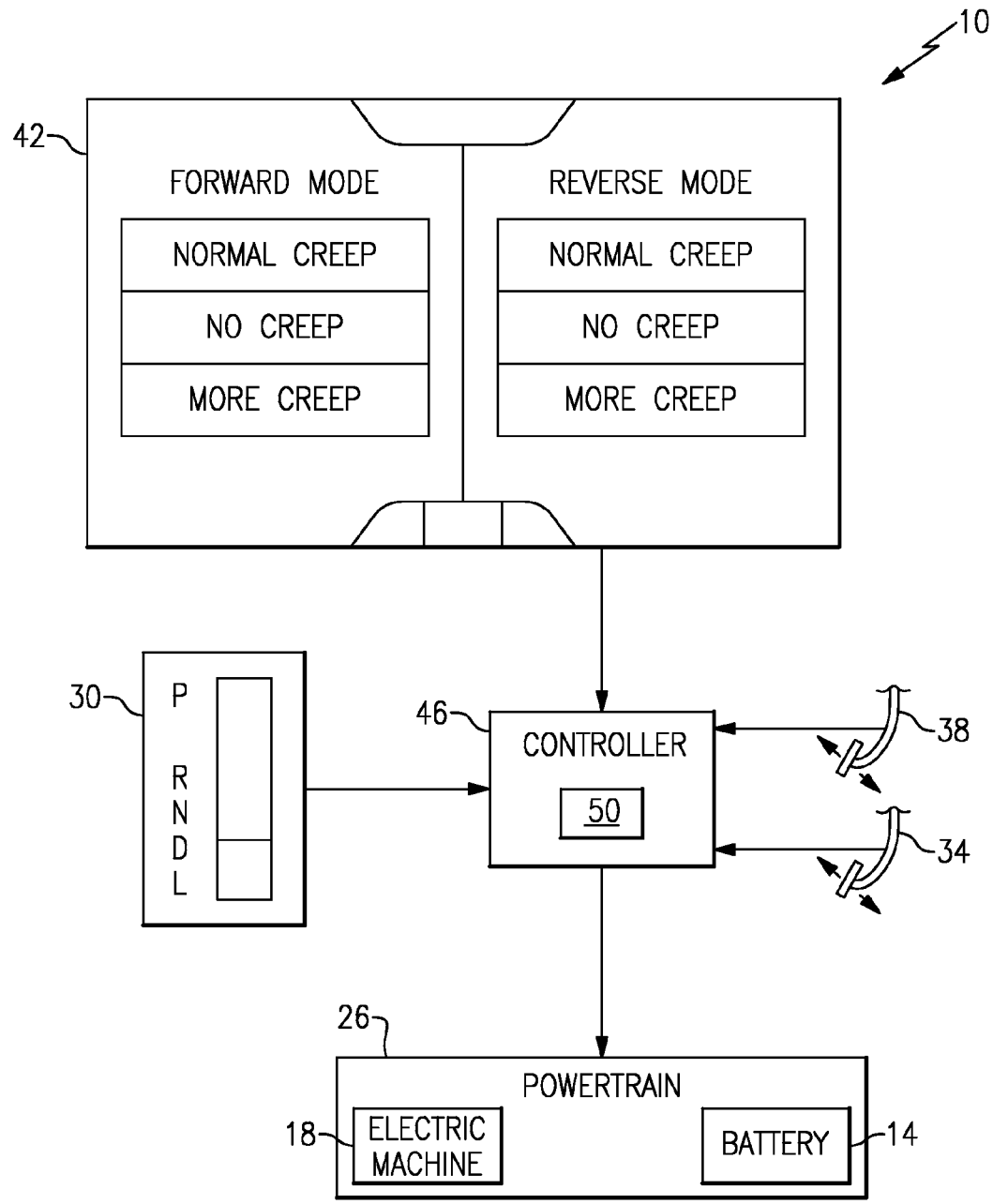
FIG. 2 shows a highly schematic view of portions of the electrified vehicle of FIG. 1.

Referring now to FIG. 2 with continuing reference to FIG. 1, the example electrified vehicle 10 includes a powertrain 26 having the battery 14 and the electric machine 18. The 10 vehicle further includes a gear selector 30, an accelerator pedal 34, a brake pedal 38, a selection interface 42, and a controller 46.

A user of the vehicle 10 positions the gear selector 30 to actuate the vehicle 10 between park, reverse, neutral, drive, and low. The user actuates the gear selector 30 to cause the powertrain 26 to move the vehicle 10 forward or reverse.

The vehicle 10 is in a forward drive mode when the gear selector 30 is positioned in drive (as shown) or low. When in the forward drive mode, depressing the accelerator pedal 34 and releasing the brake pedal 38 causes the powertrain 26 to apply torque to the wheels 22 that moves the vehicle 10 forward.

The vehicle 10 is in a reverse drive mode when the gear selector 30 is in reverse. When in the reverse drive mode, depressing the accelerator pedal 34 and releasing the brake pedal 38 causes the powertrain 26 to apply torque to the wheels 22 to move the vehicle 10 in reverse.

In the example vehicle 10, when the gear selector 30 is in the forward drive mode, and the accelerator pedal 34 and brake pedal 38 are not depressed, the example powertrain 26 can apply a forward creep torque to the wheels 22. The forward creep torque can cause the vehicle 10 to move forward, or can maintain a position of the vehicle 10 on a grade, for example.

In the example vehicle 10, when the gear selector 30 is in the reverse drive mode, and the accelerator pedal 34 and brake pedal 38 are not depressed, the example powertrain 26 can apply a reverse creep torque to the wheels 22. The reverse creep torque can cause the vehicle 10 to move in reverse, or can maintain a position of the vehicle 10 on a grade, for example.

In some examples, the vehicle 10 is configured, by default, to hold its position using creep torque on a three-percent grade, for example, without depressing the accelerator pedal 34 or brake pedal 38.

As can be appreciated, the forward creep torque is applied to rotate the wheels 22 in a first direction, and the reverse creep torque is applied to rotate the wheels 22 in a second direction opposite the first direction. Amounts of forward creep torque and reverse creep torque, for purposes of this disclosure, are absolute values or magnitudes of forward creep torque and reverse creep torque.

The amount of forward creep torque applied to the wheels 22 is controlled by the user through the selection interface 42, which may be a touch screen within the vehicle 10, for example. The amount of reverse creep torque applied is also controlled by the user through the selection interface 42.

In this example, the selection interface 42 permits the user to select from among three creep torque options for when the vehicle 10 is in the forward drive mode, and to select from among three creep torque options for when the vehicle is in the reverse drive mode. The user touches the touch screen to make a selection from the selection interface 42. In another example, the user may select creep torque options using buttons or switches on a steering wheel. The buttons could be cruise control buttons that are reused to select creep torque options.

As an additional option variable creep torque could be enabled/changed through an off-board system, such as a mobile application that allows for driver selective preferences to be changed remotely. A cloud interface could be used or another system for changing vehicle settings.

An option for vehicles lacking screens that are touch-based or lacking usable steering wheel buttons could include dedicated creep torque level hard buttons that can be mounted anywhere on the vehicle. These hard buttons could allow for a selection of the creep levels on a bike, for example, or another type of vehicle.

The three creep torque options for the example vehicle 10 in the forward mode are: NORMAL CREEP, NO CREEP, and MORE CREEP. The three creep torque options for the example vehicle 10 in the reverse mode are: NORMAL CREEP, NO CREEP, and MORE CREEP. Notably, the creep torque option for the forward mode is selected independently from the creep torque option for the reverse mode. Each option corresponds to a different amount of creep torque and, more specifically, a different set creep torque level.

When the NORMAL CREEP option is selected for the vehicle 10 in the forward mode, the powertrain 26 applies a forward creep torque to the wheels 22 when the accelerator pedal 34 and the brake pedal 38 are not depressed. The forward creep torque that is applied when the NORMAL CREEP option is selected mimics forward creep torque in a conventional vehicle resulting from a spinning torque converter. The forward creep torque that is applied when the NORMAL CREEP option is selected can be set by a manufacturer of the vehicle 10, and may be the default forward creep option.

When the NORMAL CREEP option is selected for the vehicle 10 in the reverse mode, the powertrain 26 applies a reverse creep torque to the wheels 22 when the accelerator pedal 34 and the brake pedal 38 are not depressed. The reverse creep torque that is applied when the NORMAL CREEP option is selected mimics reverse creep torque in a conventional vehicle due to a spinning torque converter. The reverse creep torque that is applied when the NORMAL CREEP option is selected can be set by a manufacturer of the vehicle 10, and may be the default reverse creep option.

When the NO CREEP option is selected for the vehicle 10 in the forward mode, the powertrain 26 applies no forward creep torque to the wheels 22 when the accelerator pedal 34 or the brake pedal 38 are not depressed. When the NO CREEP option is selected and the vehicle 10 is moving in the forward mode, the vehicle 10 will roll to a stop after the accelerator pedal 34 has been released and the vehicle 10 is on level ground. The vehicle 10 will then not move again, under its own power, until the accelerator pedal 34 is depressed.

When the NO CREEP option is selected, the vehicle 10 behaves like a manual or automatic transmission vehicle that is shifted out of gear or into neutral, respectively. Some users may consider the NO CREEP option to be more efficient than other creep torque options.

When the NO CREEP option is selected and the vehicle 10 is in the reverse mode, the powertrain 26 applies no forward creep torque to the wheels 22 when the accelerator pedal 34 or the brake pedal 38 are not depressed.

When the MORE CREEP option is selected for the vehicle 10 is in the forward mode, the powertrain 26 applies forward creep torque when the gear selector 30 is in the drive mode and neither the accelerator pedal 34 nor the brake pedal 38 is depressed. When the MORE CREEP option is selected, the powertrain 26 will apply more forward creep torque to the wheels 22 than when the NORMAL CREEP mode is selected.

When the MORE CREEP option is selected for the vehicle 10 in the reverse mode, the powertrain 26 applies reverse creep torque when the vehicle 10 is in the reverse mode and neither the accelerator pedal 34 nor the brake pedal 38 is depressed. When the MORE CREEP option is selected, the powertrain 26 will apply more reverse creep torque to the wheels 22 than when the NORMAL CREEP OPTION is selected. For example, the NORMAL CREEP mode may apply a maximum of 500 newton-meters of torque to the wheels 22. However, if MORE CREEP is selected, 700 newton-meters of torque may be applied to the wheels 22.

In some examples, the user can incrementally increase the torque increase resulting from selecting the MORE CREEP option. For example, each time the user taps the MORE CREEP button on the selection interface 42 for the forward mode, the forward creep torque may increase by 100 newton-meters. One tap of the MORE CREEP option on the selection interface 42 may increase creep torque by 100 newton-meters, but two taps may increase the creep torque by 200 newton-meters.

In other examples, the user may increase or decrease the creep torque associated with the MORE CREEP option using buttons, such as cruise-control type buttons mounted on the steering wheel.

When the MORE CREEP option is selected, the vehicle 10 can accelerate quicker to its maximum creep speed. In some examples, the MORE CREEP option may cause the vehicle 10 to more effectively maintain its creep speed if the vehicle 10 is heavily loaded.

The MORE CREEP option for the forward mode may permit forward one pedal driving at low speeds within relatively constricted locations, such as parking lots and garages. That is, the vehicle 10 is able to creep forward in such locations without requiring the user to depress the accelerator pedal 34.

On grades, the MORE CREEP option can reduce or eliminate the need to quickly transition between lifting the accelerator pedal 34 and depressing the brake pedal 38.

In the example of FIG. 2, the NO CREEP option can be selected for the vehicle 10 when in the forward mode, and the NORMAL CREEP option can be selected for the vehicle 10 when the in reverse mode.

The amount of forward creep torque is selected independently from the amount of reverse creep torque. The user can thus configure the vehicle to have the NO CREEP option when the gear selector 30 is in the drive mode, but have the NORMAL CREEP option when the gear selector 30 is in the reverse mode.

The controller 46 receives the input from the selection interface 42. The input may be stored in a memory portion 50 of the controller. In this example, the selections made by the user through the selection interface 42 are maintained through subsequent drive cycles until the user reconfigures the vehicle 10 using the selection interface 42.

The controller 46 causes the powertrain 26 to exert an appropriate amount of forward creep torque and an appropriate amount of reverse creep torque based on the selections made by the user through the selection interface 42, and based on the position of the gear selector 30, and whether the accelerator pedal 34 and the brake pedal 38 are depressed.

In this example, the selected creep torque options for the forward mode and the reverse mode are maintained between key cycles. That is, once the user sets the creep torque options for the vehicle 10 through the selection interface, those options are maintained until the user chooses to change the creep torque options.

The creep torque options selected by the user can be displayed on an instrument cluster or touch panel within the vehicle 10.

The creep torque options may be individualized for different users as a user-based preference. In such examples, the vehicle 10 considers the selected creep torque options to be user-specific presets. The selected creep torque options thus change in response to a particular user. The seat position button or a user-specific key can help the vehicle identify the user. The vehicle 10 then automatically changes the selected creep torque options, if required.

The torque options can be set by someone other than a driver of the vehicle, such as by a dealer at a dealership.

More than three creep torque options or less than three creep torque options may be presented for the forward drive mode, the reverse drive mode, or both. In some examples, two creep torque options, on or off, are presented for the forward drive mode and two creep torque options, on or off, are presented for the reverse drive mode.

In some examples, the vehicle 10 may have different driving modes, such as a standard mode and an ECO mode. The ECO mode can have, for example, change vehicle behavior to enable a user to drive more efficiently. The creep torque options selectable by the user when the vehicle 10 is in the standard mode can differ from the creep torque options selectable by the user when the vehicle is in the ECO mode. Any number of vehicle modes are possible and creep torque options could be separately selectable by a user in any of these vehicle modes.

In other examples, the creep torque options available for selection using the selection interface 42 can include an ANTI-ROLL option. When this creep torque option is selected for the vehicle 10 in a forward mode, the controller 46 varies the forward creep torque within a particular range to keep the vehicle 10 stationary on a steep grade and to prevent the vehicle 10 from creeping forward or rolling back when the vehicle 10 is on the steep grade, for example.

An additional option to achieve Anti-Roll while selectable creep is engaged on a steep grade, could include engaging an electric parking brake or friction braking to hold the position if the amount of forward creep torque required is beyond the specified allowable range to keep the vehicle stationary.

The ANTI-ROLL option, or another of the creep torque options, can include a grade compensating feature. This feature can be activated if the vehicle 10 is stopped on a substantial grade. The vehicle 10 can infer that the vehicle 10 is on a substantial grade based on power to the wheels 22 required to hold a position of the vehicle 10. The vehicle 10 can instead or additionally detect a substantial grade based on measurements from a longitudinal accelerometer within a chassis control system, or based on a GPS system. A person having skill in this art and having the benefit of this disclosure would understand how to detect grade beneath the vehicle 10.

In other examples, creep torque options selected using the selection interface 42 can include an ENGINE START PREVENTION option. When this option is selected, the controller 46 clips the level of creep torque sent to the wheels 22 to make sure that, in an electrified vehicle having an internal combustion engine, the internal combustion engine does not start does not occur without the accelerator pedal 38 depressing. The controller 46 may clip the creep torque level based upon the current battery discharge power level and cooling requests.

The creep torque option may include a learning feature that recognized a driving habit and automatically selects a particular creep torque option based on a user's driving style. For example, if the controller 50 obtains data that the user is applying a brake to cancel a forward creep torque, the controller 50 may automatically select, or prompt the user to select, the NO CREEP option for the forward mode during a subsequent drive cycle.

Figure 3:
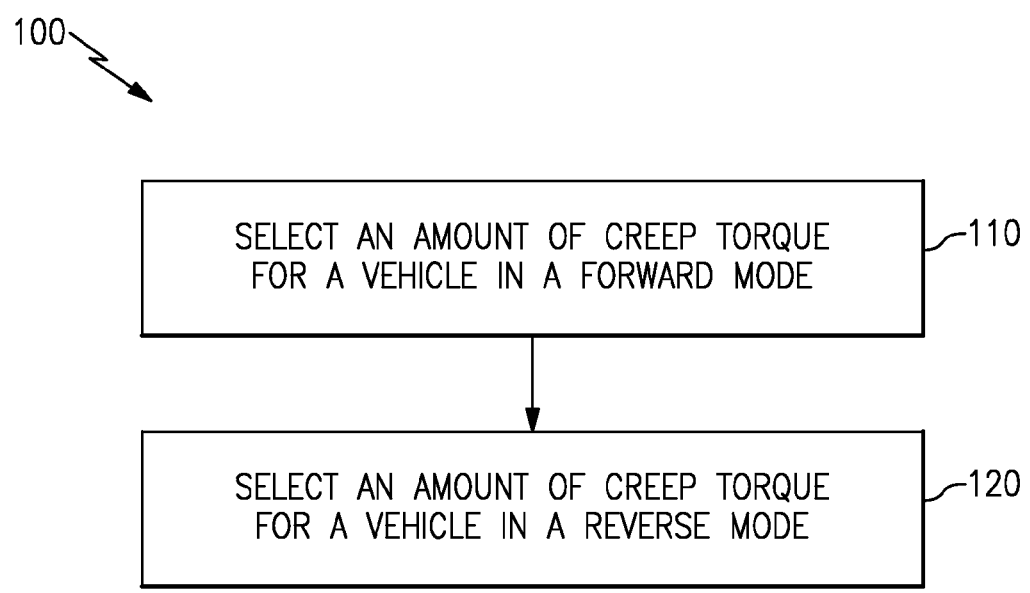
FIG. 3 illustrates a flow of an example creep torque selection method.

Referring now to FIG. 3, an example creep torque selection method 100 includes a step 110 of selecting an amount of creep torque for the vehicle 10 when in a forward mode. At a step 120, the method includes a set of selecting an amount of creep torque for the vehicle 10 when in a reverse mode.

Notably, the selected amount of forward creep torque can differ from the selected amount of reverse creep torque. In some examples, the amount of forward creep torque may be zero while the amount of reverse creep torque may be greater than zero.

Creep in the electrified vehicle 10 is powered by the battery 14 (FIG. 1). In other examples, the electrified vehicle 10 is a hybrid electric vehicle 10, and the creep is powered by the battery, an internal combustion engine, or both.

Although described above in connection with the electrified vehicle 10, which is an all-electric vehicle, the examples described herein can be used in connection with a conventional vehicle. In such examples, the user can selectively increase or decrease an idle speed for an internal combustion engine in a forward mode and selectively increase or decrease an idle speed for the internal combustion engine in a reverse mode.

Features of the disclosed examples include providing a user with an ability to configure an amount of forward creep torque separately from an amount of reverse creep torque. The user may desire to vary the level of forward creep torque from the amount of reverse creep torque in response to a particular grade of their parking spot, within a driveway for example. If the user wishes to move forward from a parking spot having a relatively steep uphill grade, forward creep torque may not cause the vehicle to move due to the steep grade. The user may thus desire to turn off forward creep torque to conserve power from the battery.

The disclosed method provides the user with the ability to potentially maintain a reverse creep torque for the vehicle so that depressing the accelerator pedal is not necessary to move the vehicle in reverse.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A creep torque selection method, comprising:
    selecting a maximum amount of reverse creep torque for a vehicle with a brake pedal released, the maximum amount selected of reverse creep torque being independent from a maximum amount of forward creep torque selected for the vehicle with the brake pedal released; and
    applying reverse creep torque at or below the maximum amount to at least one wheel of the vehicle.

2. The method of claim 1, further comprising the step of selecting the maximum amount of forward creep torque for the vehicle without changing the maximum amount selected of reverse creep torque, the maximum amount selected of reverse creep torque different than the maximum amount selected of forward creep torque.

3. The method of claim 1, wherein the maximum amount of forward creep torque is less than the maximum amount of reverse creep torque.

4. The method of claim 3, wherein the maximum amount of forward creep torque is zero.

5. The method of claim 1, wherein the maximum amount of reverse creep torque is selected from at least two preset amounts of maximum reverse creep torque.

6. The method of claim 5, wherein the at least two preset amounts of maximum reverse creep torque comprise zero reverse creep torque and an increased maximum amount of reverse creep torque.

7. The method of claim 1, wherein at least one wheel of the vehicle is driven exclusively with torque from an electric machine such that the vehicle is an all-electric electrified vehicle.

8. The method of claim 1, further comprising selecting a maximum amount of forward creep torque for a vehicle without changing the selected maximum amount of reverse creep torque.

9. A creep torque operating method, comprising:
    when a vehicle is in a forward mode and a brake pedal is released, applying a maximum forward creep torque that does not exceed a set forward creep torque level; and
    when the vehicle is in a reverse mode and the brake pedal is released, applying a maximum reverse creep torque that does not exceed a set reverse creep torque level, wherein the set forward creep torque level is different than the set reverse creep torque level and is adjustable independently from the set reverse creep torque level.

10. The method of claim 9, wherein the vehicle is selectively operable in an ECO vehicle operating mode or a NORMAL vehicle operating mode, the set forward and set reverse creep torque levels are both separately selectable in the ECO mode and are both separately selectable in the NORMAL mode.

11. The method of claim 9, further comprising the step of selecting the set forward creep torque level and separately selecting the set reverse creep torque level without changing the set forward creep torque level.

12. The method of claim 11, wherein the selecting of the set forward creep torque level is independent from the selecting of the set reverse creep torque level.

13. The method of claim 11, wherein the selecting is based on a grade of a road on which the vehicle operates.

14. The method of claim 11, wherein the selecting is by a user of the vehicle.

15. The method of claim 9, wherein the set forward creep torque level is zero.

16. The method of claim 9, wherein the vehicle has a plurality of drive wheels driven exclusively with torque from the electric machine such that vehicle is an all-electric electrified vehicle.

17. A vehicle assembly, comprising:
a wheel of a vehicle; and
a controller that commands an electric machine of the vehicle to apply a maximum forward creep torque to the wheel when the vehicle is in a forward mode and a brake pedal of the vehicle is not depressed, and a maximum reverse creep torque to the wheel when the vehicle is in a reverse mode and the brake pedal is not depressed, wherein the maximum forward creep torque does not exceed a set forward creep torque level, and the maximum reverse creep torque does not exceed a set reverse creep torque level that is different than the set forward creep torque level.

18. The assembly of claim 17, wherein the set forward creep torque level is zero.

19. The assembly of claim 17, wherein at least one wheel of the vehicle is driven exclusively with torque from an electric machine such that the vehicle is an all-electric electrified vehicle.

20. The assembly of claim 17, further comprising a user interface to permit selection of the set forward creep torque level, or the set reverse creep torque level, or both, wherein the set forward creep torque level is adjustable independently from the set reverse creep torque level such that adjusting the set forward creep torque level does not change the set reverse creep torque level.

* * * * *